US010466121B2

(12) United States Patent
Lisseman et al.

(10) Patent No.: US 10,466,121 B2
(45) Date of Patent: Nov. 5, 2019

(54) FORCE-BASED DETECTION SYSTEMS AND METHODS

(71) Applicant: JOYSON SAFETY SYSTEMS ACQUISITION LLC, Auburn Hills, MI (US)

(72) Inventors: Jason Carl Lisseman, Shelby Township, MI (US); David William Andrews, Ortonville, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 498 days.

(21) Appl. No.: 14/640,604

(22) Filed: Mar. 6, 2015

(65) Prior Publication Data

US 2015/0253211 A1    Sep. 10, 2015

Related U.S. Application Data

(60) Provisional application No. 61/948,926, filed on Mar. 6, 2014.

(51) Int. Cl.
G01L 5/22       (2006.01)
G01D 5/02       (2006.01)

(52) U.S. Cl.
CPC .............. *G01L 5/221* (2013.01); *G01D 5/02* (2013.01)

(58) Field of Classification Search
None
See application file for complete search history.

(56) References Cited

U.S. PATENT DOCUMENTS

| | | | |
|---|---|---|---|
| 5,238,076 A | 8/1993 | Aznar et al. | |
| 2002/0124663 A1* | 9/2002 | Tokumoto | B62D 6/10 73/862.333 |
| 2003/0062215 A1* | 4/2003 | Yasuda | B62D 6/10 180/444 |
| 2004/0262063 A1* | 12/2004 | Kaufmann | B62D 1/286 180/169 |
| 2007/0289806 A1* | 12/2007 | Matsuda | B62D 3/12 180/444 |
| 2008/0030188 A1* | 2/2008 | Ponziani | G01D 5/147 324/207.2 |
| 2008/0164087 A1* | 7/2008 | Koyama | B62D 6/008 180/402 |
| 2010/0064822 A1* | 3/2010 | Debrailly | B62D 6/10 73/862.326 |

(Continued)

*Primary Examiner* — Alexander G Ghyka
(74) *Attorney, Agent, or Firm* — Meunier Carlin & Curfman LLC

(57) ABSTRACT

Systems and methods described herein provide a position sensor system configured to sense a relative position between a reference object and a sensed object, where the sensed object has a varying surface. The position sensor system may include at least one force sensor supported by the reference object and positioned adjacent to and in sensory communication with the varying surface. The sensor may be configured to generate a signal related to a force sensed due to a position of the varying surface relative to the sensor. A processor may be configured to determine, using the force signal, the position of the sensed object relative to the sensor. The position sensor system may be used to identify a torque of an elongated vehicle member, for example.

25 Claims, 12 Drawing Sheets

(56) References Cited

U.S. PATENT DOCUMENTS

| | | | |
|---|---|---|---|
| 2010/0319467 A1* | 12/2010 | Diekmann | G01L 3/105 |
| | | | 73/862.332 |
| 2012/0285266 A1* | 11/2012 | Takahashi | B62D 6/10 |
| | | | 73/862.331 |
| 2013/0099107 A1* | 4/2013 | Omoto | F16C 41/007 |
| | | | 250/231.13 |
| 2013/0186209 A1* | 7/2013 | Herbst | G01L 5/221 |
| | | | 73/862.333 |
| 2014/0020481 A1* | 1/2014 | May | G01L 1/127 |
| | | | 73/862.69 |
| 2014/0174202 A1* | 6/2014 | Yukimura | G01L 3/104 |
| | | | 73/862.193 |
| 2015/0040686 A1* | 2/2015 | Maehara | B62D 15/02 |
| | | | 73/862.325 |

* cited by examiner

FORCE-BASED DETECTION SYSTEMS AND METHODS

CROSS REFERENCE TO RELATED APPLICATIONS

This application claims priority to U.S. Provisional Patent Application No. 61/948,926, entitled "Force-Based Position Detector," filed Mar. 6, 2014, the content of which is herein incorporated by reference in its entirety.

BACKGROUND

Steering systems in automobiles originally were largely mechanical in nature. Oftentimes, the steering wheel had some type of a pinion or other gear that actuated a rack connected to the front wheels of the automobile. As the wheel was turned, the rack moved the wheels left-or-right depending upon the direction of turn.

Steering systems have increasingly relied upon intervening electronic systems and mechano-electric (hydraulic) systems for safety, control and other purposes. Conventional systems employ position detectors connected to the steering components, such as the shaft or rack of the steering system. These position detectors may, for example, be based on optical or potentiometer position detection methods. Automotive and other manufacturers, however, find that the cost and lack of robustness of these position detectors are problematic.

In addition, some conventional systems may employ a Hall effect torque sensor on steering wheel components, such as a shaft connected to the steering wheel. For example, U.S. Pat. No. 5,238,076 ("the '076 patent") describes an electric power steering system. The electric power steering system includes a steering wheel torque sensor that delivers an all or nothing signal. However, delivering an all or nothing signal does not provide linear torque values measured across a torsional member. Other systems also use traditional Hall effect sensors that are relatively large and expensive to manufacture. Hall effect sensors also have a delay when providing feedback. The delay can be critical in time-sensitive areas such as controlling the angle of a steering wheel and other vehicle systems.

It would be advantageous to have a robust, cost-effective sensor system for determining relative positions of two or more objects. In particular, it would be advantageous to have a sensor system capable of robustly and accurately determining the position of steering components with a relatively low cost.

BRIEF SUMMARY

Various implementations include a position sensor system configured to sense a relative position between a reference object and a sensed object having a varying surface. The position sensor system includes at least one force sensor supported by the reference object and positioned adjacent to and in sensory communication with the varying surface. The system also includes computer processor in electrical communication with the force sensor. The sensor is configured to generate a signal related to a force sensed due to a position of the varying surface relative to the sensor. The processor is configured to determine, using the force signal, the position of the sensed object relative to the sensor.

In some implementations, the position sensor system may include the varying surface. The varying surface may vary continuously through a range of positions, such as from 0 to 360 degrees. For example, in some implementations, the sensed object has a circular cross-section, and the varying surface extends along an outer circumference of the circular cross-section. In such implementations, the position of the sensed object may be a rotational position.

In some implementations, the varying surface has a repeating shape. For example, the repeating shape may include a series of maxima and minima. The position sensor system may also include a counter configured to track the passage of maxima and minima. The processor may be configured to determine the position using the passage of maxima and minima.

In some implementations, the varying surface has a plurality of discontinuities. For example, the discontinuities may be transitions between a plurality of flat surfaces. As one example, the discontinuities may be the sides of a plurality of steps and the flat surfaces are the tops of a plurality of steps. The steps may extend in a sinusoidal pattern.

In some implementations, the system may also include a coupling configured to extend between a sensing surface of the force sensor and the varying surface. The coupling may include a spring medium, such as an elastomer or a mechanical spring.

In some implementations, the varying surface is positioned between a pair of bearings. For example, the varying surface may be on a flange extending from the sensed object, the sensed object may be a shaft, and the at least one force sensor includes a plurality of force sensors. In one implementation, the plurality of force sensors are equally spaced around and adjacent to the varying surface, such as including four sensors arranged at 90 degree intervals around the varying surface.

In some implementations, the reference object and sensed object may be relatively moveable with a rotational component or a translational component.

In some implementations, the varying surface may include at least one key feature differing from the remainder of the varying surface. The feature may be one of a high or low point relative to the remainder of the varying surface, for example. For example, the feature may be a plateau. The processor may be configured to associate the feature with a zero point.

Other various implementations include a system for determining torque in an elongate vehicle member having a varying outer surface. The system includes a first rotational position sensor disposed adjacent a first axial location of the varying outer surface of the elongate vehicle member, a second rotational position sensor disposed adjacent a second axial location of the varying outer surface of the elongate vehicle member, and a computer processor in electrical communication with the first and second rotational position sensors. The first rotational position sensor is in sensory communication with the varying outer surface at the first axial location, and the second rotational position sensor is in sensory communication with the varying outer surface at the second axial location. The first axial location and the second axial location are separate and spaced apart along an axis of the elongate vehicle member.

The processor is configured for: (1) receiving a first force signal associated with a first rotational position of the first axial location of the elongate vehicle member from the first rotational position sensor, (2) receiving a second force signal associated with a second rotational position of the second axial location of the elongate vehicle member from the second rotational position sensor, (3) calculating a differential between the first and second rotational positions, and (4)

determining a torque associated with the elongated vehicle member between the first and second axial positions using the calculated differential. The processor may also be configured for communicating a control signal to a separate vehicle system in response to the torque exceeding a threshold value.

BRIEF DESCRIPTION OF THE DRAWINGS

The components in the drawings are not necessarily to scale relative to each other and like reference numerals designate corresponding parts throughout the several views.

DETAILED DESCRIPTION

Figure 1:
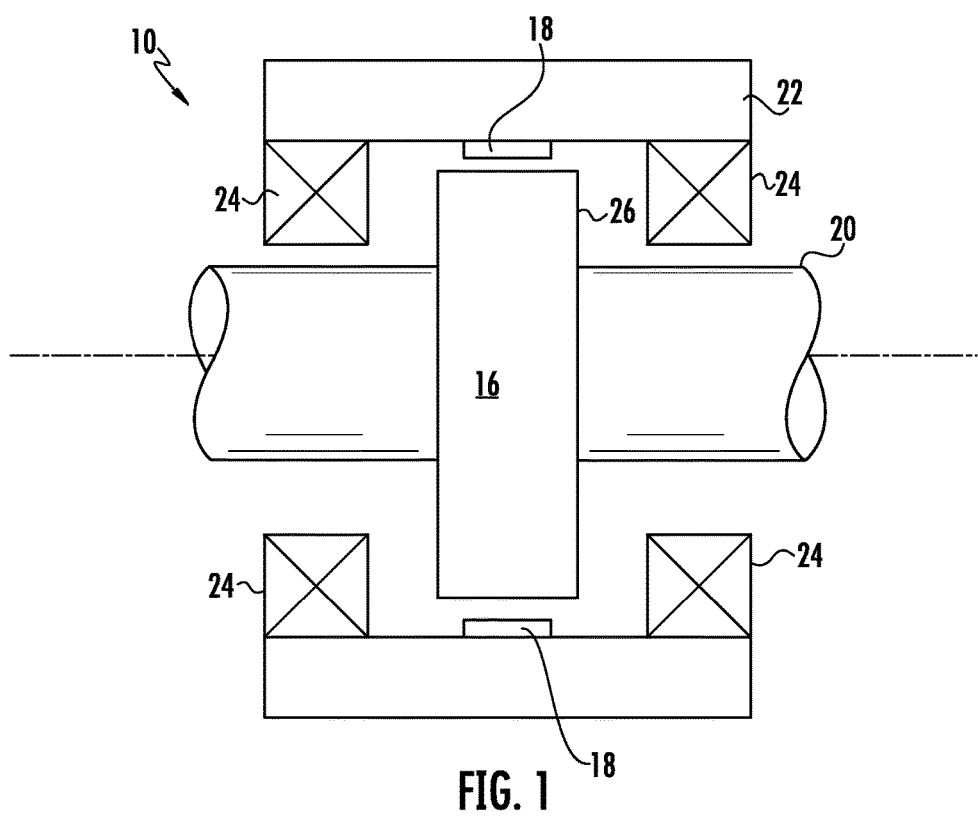
FIG. 1 is a cross sectional view of a position sensor system according to one implementation.

Various implementations include a position sensor system configured to sense a relative position between a reference object and a sensed object having a varying surface. The position sensor system may include at least one force sensor supported by the reference object and positioned adjacent to and in sensory communication with the varying surface. The sensor may be configured to generate a signal related to a force sensed due to a position of the varying surface relative to the sensor. Also, a processor in electrical communication with the sensor may be configured to determine, using the force signal, the position of the sensed object relative to the sensor.

Systems and methods are also disclosed for determining torque using force sensors. For example, force sensors may be used to detect a first rotational position of a first axial location of an elongate vehicle member and a second rotational position of a second axial location of the elongate vehicle member. The first axial location is spaced apart, along an axis of the elongate vehicle member, from the second axial location. Further, a processor in electrical communication with the first and second rotational position sensors calculates a differential between the first and second rotational positions based on the signals received from the force sensors and determines a torque associated with the elongate vehicle member between the first and second axial locations using the differential.

Various implementations of the position sensor system may have cost and reliability advantages over conventional sensor systems. For example, various implementations of the position sensor system may be used for automotive applications, such as steering wheels, which have vibration, weight, geometry and other characteristics that may not be conducive to using more delicate conventional sensors. For example, the position sensor systems may have a smaller footprint as compared to the typical size of a Hall effect sensor. Further, Hall effect sensors are distant dependent, meaning changes in distance affect the quality of reading, whereas the position sensor systems disclosed may include a spring function that allows for greater manufacturing tolerances.

In addition, a force-based position sensor system may supply force feedback for a haptic generator in a human-machine interface (HMI). The position sensor system may also provide input to other systems on a vehicle, such as providing the steering rotation to determine whether a vehicle may have lost control and needs individual wheel braking to regain control. The position for a steering wheel can also be used in a variety of applications, including accident avoidance, lane changing assist, parking assistance, and other applications.

The term "reference object" may include a moving reference object in that the system may be determining the relative positions of the objects. Also, the term "object" is not being used to mean strictly a single, unitary object but could also merely be a non-physical coordinate system and/or a plurality of physical objects.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The exemplary implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, in one exemplary embodiment, position sensor system 10 may include a rotatable shaft 20 as the sensed object and a bearing support 22 as the reference object. For example, the implementation of FIG. 1 may be for a steering wheel shaft or for a drive shaft of a machine. The position sensor system 10 in this implementation may sense the relative rotational position between the rotatable shaft 20 and the bearing support 22.

The bearing support 22, for example, may be a cylindrical housing having positioned therein a pair of concentrically aligned cylindrical bearings 24. The cylindrical bearings may be mounted within an inside diameter of the cylindrical housing 22. The cylindrical bearings 24 may support and allow axial rotation of the shaft 20. The cylindrical bearings 24 are spaced apart along the axis of the shaft 20 to define a space in-between.

Positioned within the space between the bearings 24, in this exemplary implementation, is a pair of force sensors 18. As shown in FIG. 1, the force sensors 18 may be mounted to the inside diameter of the cylindrical housing 22. The force sensors 18 may be positioned on opposite sides of the shaft 20 adjacent to a varying surface 16, as described in more detail below. One, two, three, four (as shown in FIG. 2) or more force sensors 18 may be used for increased redundancy and accuracy in the sensing of positions.

The rotatable shaft 20 may also be adapted to facilitate the operation of the position sensor system (or may be part of the system itself). For example, the rotatable shaft may include a cylindrical flange 26 formed, mounted or otherwise associated with, the rotatable shaft that is sized to extend into the space between the spaced bearings 24. The outside of the cylindrical flange 26 supports thereon the varying surface 16 in a position more accessible to the relatively low profile force sensors 18. Also, the enlargement of the surface of the cylindrical flange 26 over the shaft itself improves the resolution and/or accuracy of the sensor-varying surface interface.

The cross-sections of the sensed object may also vary and include planar surfaces, curved surfaces or combinations thereof. For example, the cross-section of the flange 26 may be circular.

Figure 2:
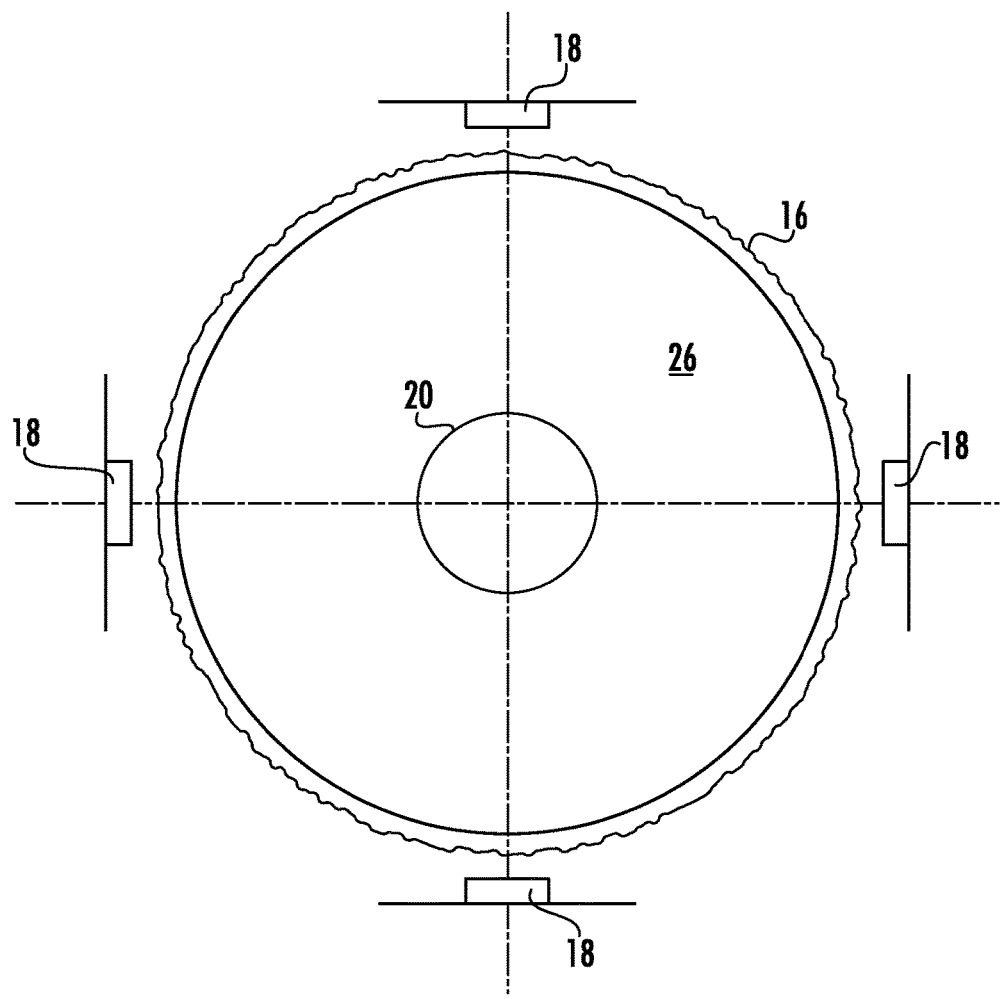
FIG. 2 is an end view of a shaft and rotation position sensors according to another implementation.

FIG. 2 shows an implementation of four sensors 18 spaced at 90 degree intervals around the axis of the rotatable shaft 20. FIG. 2 is an end-on view of the shaft 20, and the reference object in this implementation may include four planar surfaces supporting the force sensors 18. Additional sensors could be used, either equally spaced—such as 6 sensors at 60 degree intervals—or spaced to account for expected variations in positions. In one example, fewer or additional sensors could be used where expected loading on the shaft requires or benefits (due to shaft bending) from additional redundant measurements.

Figure 3:
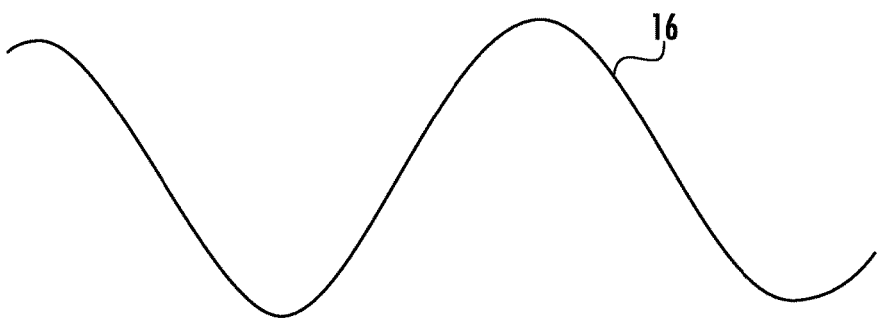
FIG. 3 illustrates a partial side view of sinusoidal topography of a varying surface according to one implementation.

FIG. 3 illustrates an implementation of a topography of the varying surface 16. In particular, FIG. 3 shows a sinusoidal, repeating surface topography that can be applied to the sensed object across a range of surfaces. For instance, the sinusoidal surface topography can be applied to the cylindrical surface of the flange 26 or the shaft 20. Also, the sinusoidal surface topography can be applied to planar or mixed surfaces.

Application of the unique surface topography causes a varying application of force to the adjacent force sensor(s) 18. The force signal received by each force sensor 18 is electrically communicated to a processor, which is configured to correlate the signal from the force sensor with a relative position of the varying surface 16 and its underlying sensed object. For example, the processor may identify the high force of the peak (maximum) and the low force (minimum) of the trough from the signal from the sensor 18 and use the number of peaks and troughs as an indication of position. The processor could also include a counter function (including processing power and memory associated therewith) for keeping track of the number of maxima and minima encountered. Processing may correlate the number to a peak or trough to degrees (or position) map or ratio to determine the relative positioning. The processor could further resolve the distance between a peak and trough by the proportion of the force between the peak and trough force. Further, the rate of change over time may be calculated to determine rotation speed.

In some implementations, one processor may be associated with each force sensor 18 or with a plurality of force sensors 18. In addition, in various implementations, the processor may be disposed within a housing (not shown) of the force sensor 18 or external to the force sensor 18. For example, the processor may be disposed adjacent to the force sensor 18 (e.g., embedded adjacent thereto in the reference object) (not shown) or disposed further away from the sensor 18 (e.g., in a computer, such as processor 510 in computer 500 described below in relation to FIG. 9).

The varying surface 16 may vary continuously through a range of positions and thereby supply an analog or near-analog signal. For example, the sinusoidal surface shown in FIG. 3 varies continuously. When applied about the outside of the flange 26's toroidal or cylindrical shape, the variations extend continuously through a range of 0 to 360 degrees. A full 360 degrees of rotation could be determined for any closed shape covered with the varying surface, such as an elliptical or square shape. Notably, the varying surface may also be three-dimensional so as to allow a determination of an x-y-z position. For example, two orthogonal sinusoidal waves could be used to form a series of three-dimensional mounds and valleys extending across an underlying planar surface to determine x-y position. In this example, the z-coordinate may correspond to the amount of force.

Figure 6:
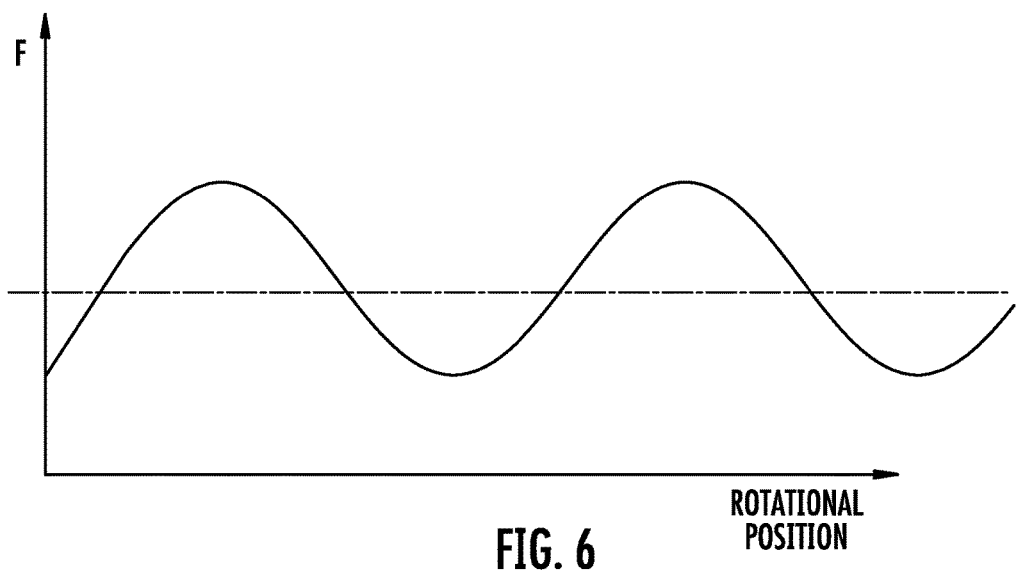
FIG. 6 is a graph illustrating a relationship between force detected by each sensor and rotational position according to one implementation.

The varying surface 16 may also have a repeating shape, like the peaks and troughs of the sinusoidal shape of FIG. 6, in which the system may count the number of peaks and troughs to determine rotational position.

Figure 4:
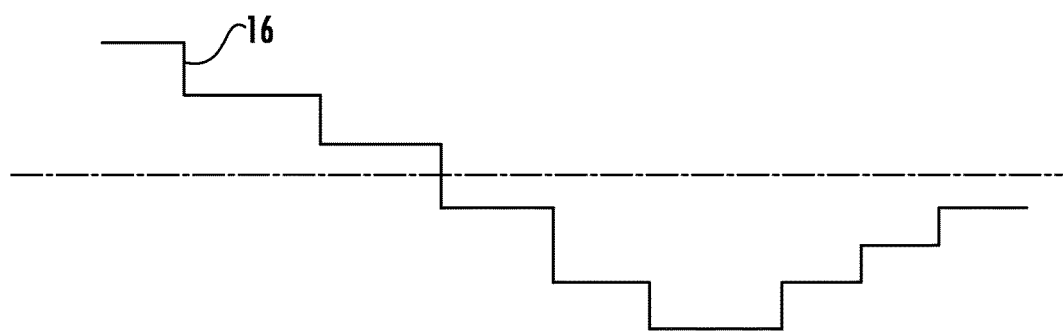
FIG. 4 illustrates a partial side view of stepped topography of a varying surface according to another implementation.

FIG. 4 shows another exemplary surface topography for use as the varying surface 16 that includes a series of steps imposed on sinusoidal wave. Each of the steps provides a discontinuity giving a more digital readout with discrete changes associated with the position changes of the reference object. For example, each of the transitions between the flat surfaces shown in FIG. 4 may be a discontinuity. In the steps, the sides are the discontinuities since they may be orthogonal to the sensing direction of the sensors 18 while the tops of the steps are the flat surfaces. The surface structure of steps (or other variations) may be layered onto other larger (lower frequency) surfaces, such as a series of large pyramidal shapes.

Figure 5:
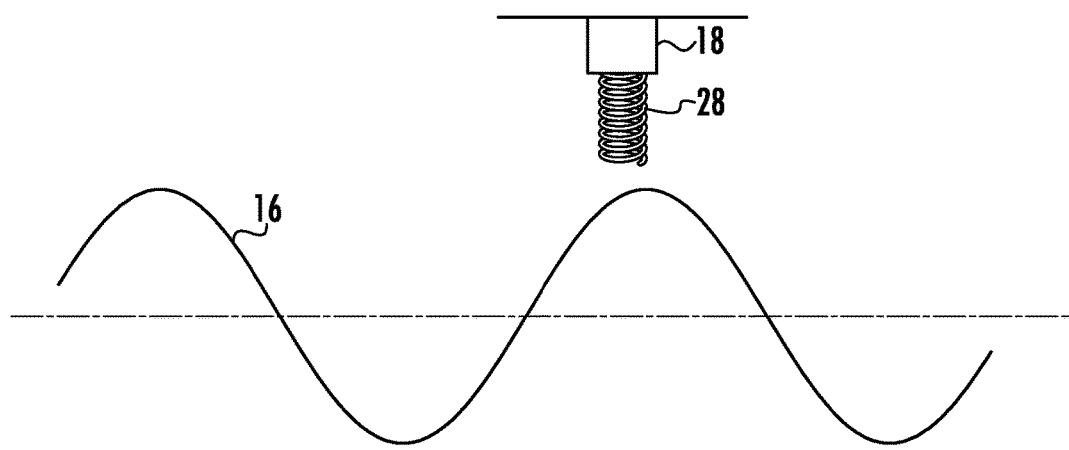
FIG. 5 illustrates a partial side view of a varying surface and a position sensor that includes a spring system, according to one implementation.

As shown in FIG. 5, the sensors 18 may include a spring system or medium 28. Generally, the spring medium 28 has spring-like properties to bridge the space between the sensors and the varying surface 16. For example, the spring medium may be a mechanical spring or some type of elastomer. The spring medium may also buffer the sensors, which may have a harder or more brittle surface, from the impacts of the varying surface.

FIG. 6 shows the relationship between force and (rotational) position. Restated, by applying a unique surface topography to the rotational (or translational) surface and allowing the force sensor to determine the force applied, the system may determine the rotational and/or translational position. The relative position may be, for example, a combination of rotational and linear or translational movement.

Additionally, use of multiple sensors may improve the accuracy and/or resolution of the system. Design of the topography of the varying surface 16 may enable multiple force sensors to be in contact around the periphery of the rotating surface. The use of 6 sinusoidal peaks could effectively provide the accuracy of 12, 24 or 36 peaks with use of 2, 4 or 6 sensors, respectively. Generally, then, increasing the feature count and/or number of sensors may provide better accuracy.

Figure 7:
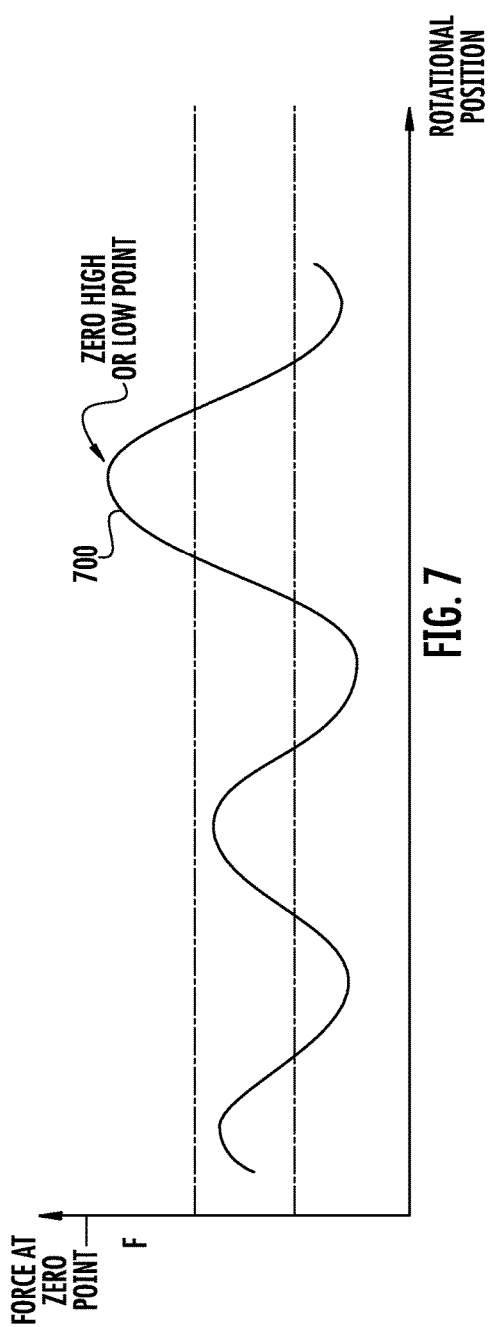
FIG. 7 is a graph illustrating a relationship between force detected by each sensor and rotational position according to another implementation.
Figure 8:
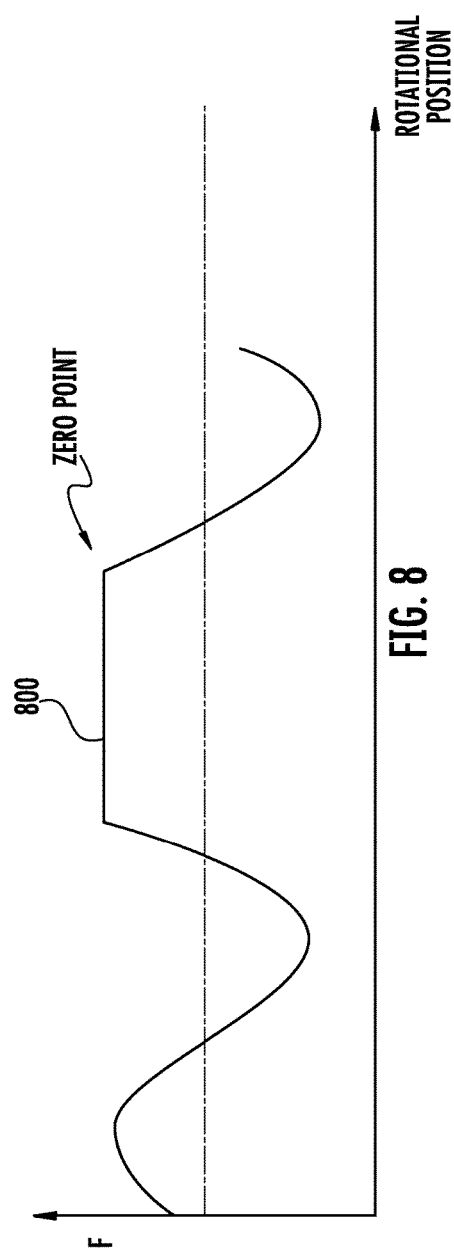
FIG. 8 is a graph illustrating a relationship between force detected by each sensor and rotational position according to another implementation.

As another implementation, the sensors could capture relative positioning by employing a unique or key feature on the topography of the rotational and/or linear surface. The system 10 may, for example, include an outsized peak 700 (as shown in FIG. 7) or a plateau 800 (as shown in FIG. 8) that the processor is configured to register as a zero point. It should be noted that other key features could be used corresponding to other reference points. And, the features could vary in different ways to be distinguishable from the remainder of the repeating features.

Figure 10:
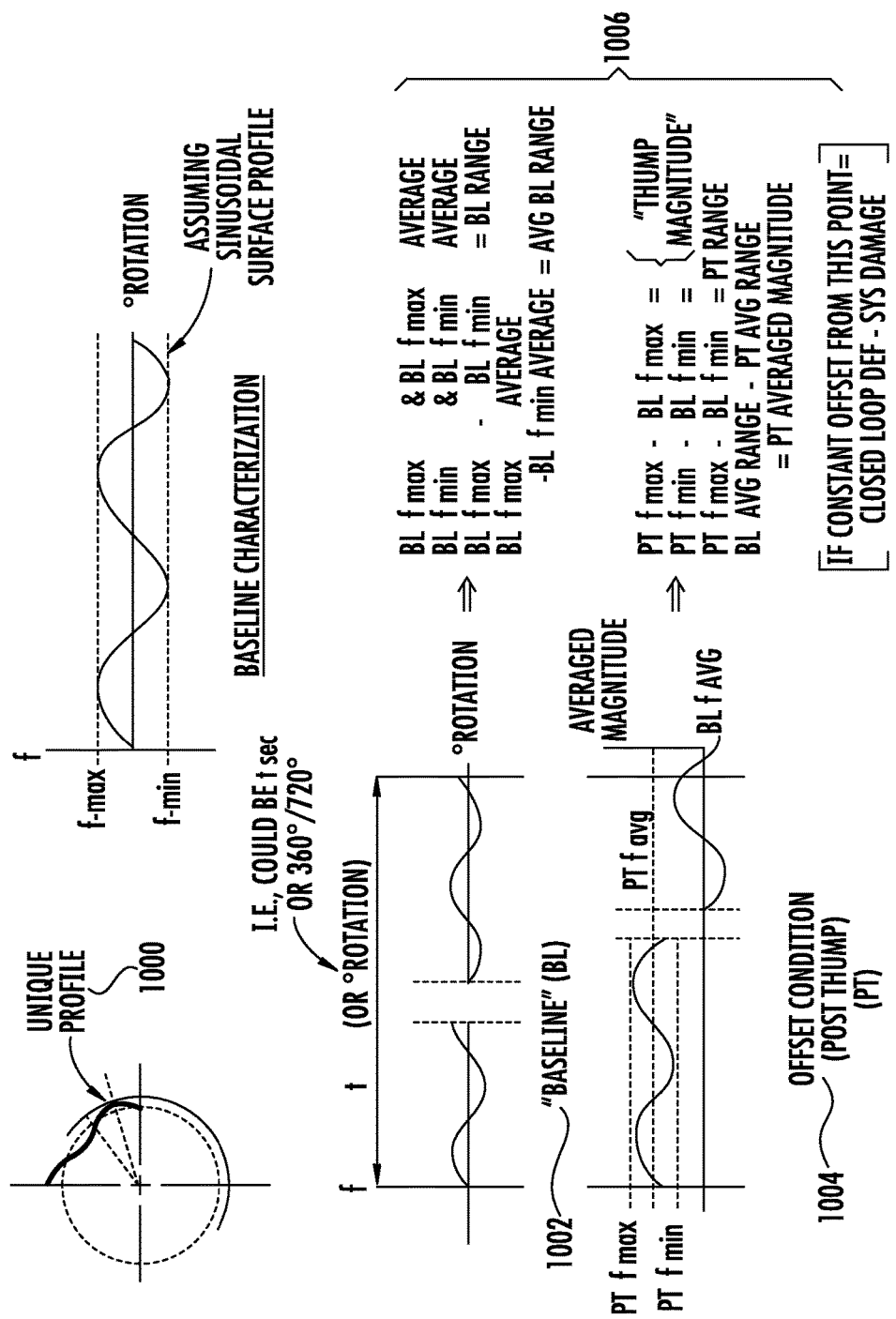
FIG. 10 is a schematic diagram illustrating baseline characterization of a varying surface profile according to the implementation shown in FIG. 3.

Turning to FIG. 10, as shown the contour of varying surface may have a unique profile 1000. This may allow the system to determine a particular steering angle at any given time. If a user were to rotate a steering angle while the car was off, or the system were to miss a reading, the relative position of the steering angle output may become unknown. Having a unique profile 1000 may allow for the relative position to be determined at any given time, while still being able to determine rate of change as previously described. Further, the system may store the quantity of full rotations within memory such that during a power down event (e.g., when a car is turned off), the system can self-calibrate to changes to the steering wheel based on the full rotations stored in memory and the unique profile 1000. A mechanical counter may be attached to the steering wheel shaft or otherwise included to track the number of full steering wheel rotations even without power, or an electronic counter may be used that automatically turns on when a steering wheel is turned, even if the car remains off, or remains in a standby state that consumes minimal power until a rotation is detected.

In the embodiment of using a sinusoidal shape, a baseline 1002 may be established over time to determine the amount of rotation. This baseline 1002 can then be used to compare when an additional shock affects the system. For example, the sensor system may be used for measuring wheel rotation, and the wheel may hit a bump on the road, leading to higher or lower values read from the sensor. The system may determine the offset condition 1004 relative to the baseline condition 1002, using, for example, equations 1006 as shown, to ensure accurate readings even in the presence of external impacts.

Figure 9:
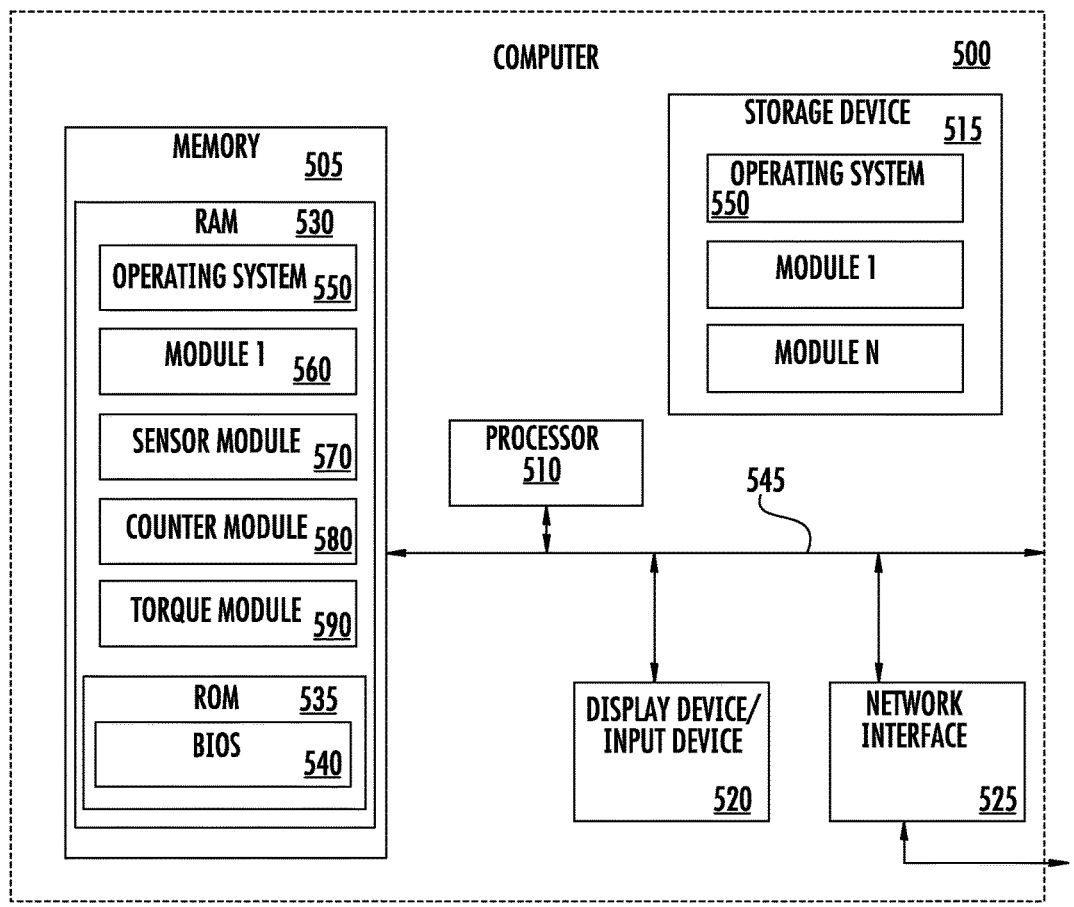
FIG. 9 is a schematic diagram of a computer according to one implementation.

FIG. 9 illustrates a schematic diagram of a computer according to one implementation that is configured to implement various aspects of one or more implementations disclosed herein. As may be understood from FIG. 9, in this implementation, the computer 500 may include a processor 510 that communicates with other elements within the computer 500 via a system interface or bus 545. Also included in the computer 500 may be a display device/input device 520 for receiving and displaying data. This display device/input device 520 may be, for example, a keyboard or pointing device that is used in combination with a monitor. The computer 500 may further include memory 505, which may include both read only memory (ROM) 535 and random access memory (RAM) 530. The server's ROM 535 may be used to store a basic input/output system 540 (BIOS), containing the basic routines that help to transfer information within a vehicle, to other systems, or even outside of a vehicle using a network.

In addition, the computer 500 may include at least one storage device 515, such as a hard disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide non-volatile storage for a computer. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 530. Such program modules may include an operating system 550 and a plurality of one or more (N) modules 560. The modules 560 may control certain aspects of the operation of the computer 500, with the assistance of the processor 510 and the operating system 550. For example, the modules may perform the functions described herein and illustrated by the figures and other materials disclosed herein.

For example, a sensor module 570 can control operation of the force sensor 18 and correlate the sensor signals associated with the force due to the varying surface features to the rotational and/or linear position of the sensed object 14. A counter module 580 may count the number of repetitions of sensed features, like peaks and troughs of the sinusoidal shape in FIG. 3, and work within or with the sensor module 570 to determine the degrees of rotation. Of course, a processor, such as processor 510, may be used to implement the various modules described in FIG. 9, alone or in combination with other processors.

Figure 11:
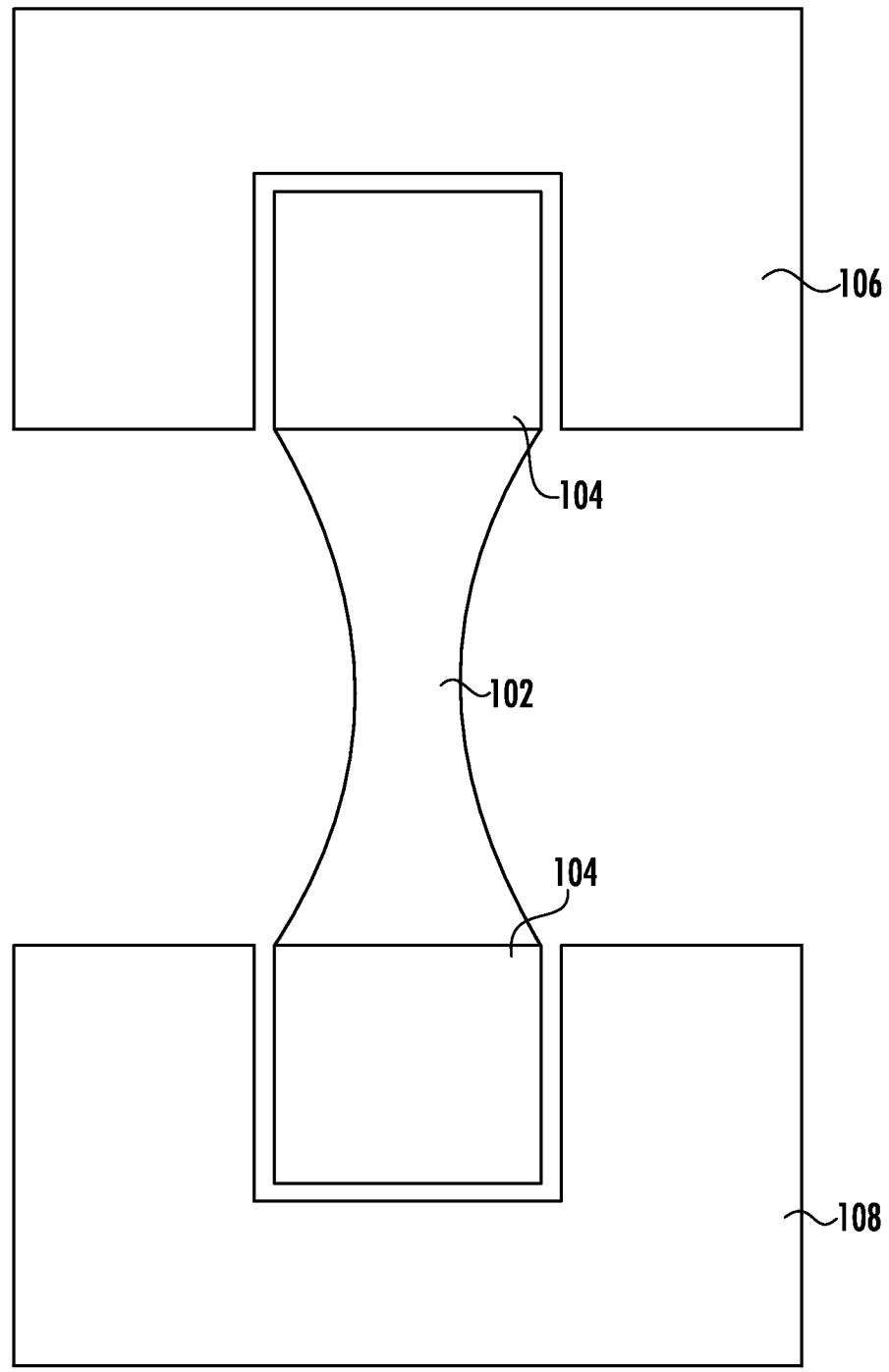
FIG. 11 illustrates a first exemplary system for calculating a torque value according to one implementation.
Figure 12:
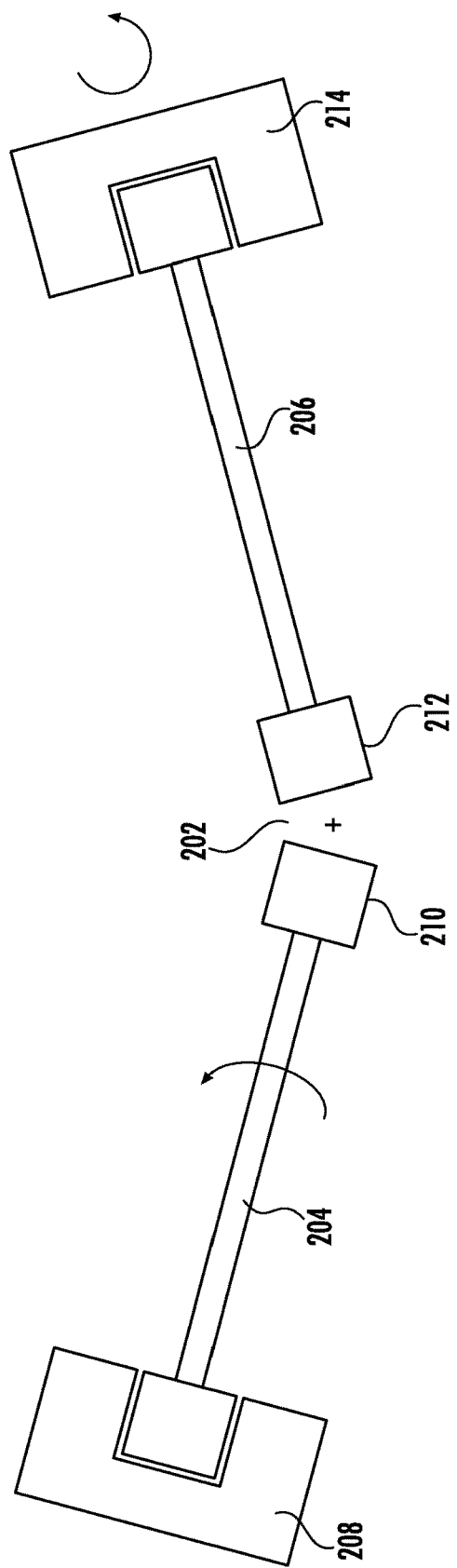
FIG. 12 illustrates a second exemplary system for calculating a torque value according to one implementation.
Figure 13:
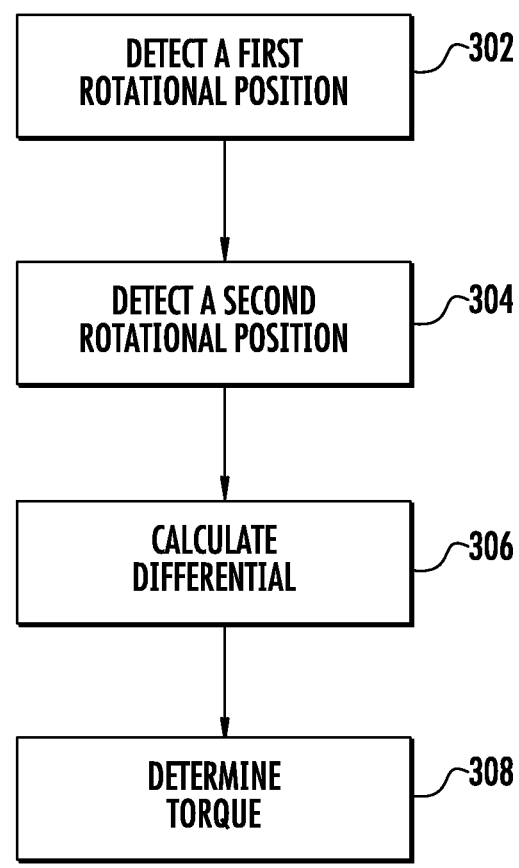
FIG. 13 illustrates an exemplary method for calculating one or more torque values according to one implementation.

FIGS. 11 through 13 are directed to implementations of systems and methods for determining an amount of torque along a torsional member using force-based torque sensors. For example, FIG. 11 illustrates an exemplary system for calculating a torque value. As shown in FIG. 11, a torsional member 102, such as a beam, may have two ends 104 axially spaced apart from each other. In one example, torsional member 102 may be, for example, a steering column. Ends 104 may be disposed adjacent torque sensors 106 and 108. Torque sensors 106 and 108 may also be placed at varying points along torsional member 102 or throughout a torsional system (e.g., a steering system) in addition to or rather than at ends 104. Although two torque sensors are shown in FIG. 11, more than two torque sensors may be disposed along the torsional member 102 axially between torque sensors 106, 108.

Torque sensors 106 and 108 may be force-based rotational position sensors, such as sensors 18 described above in relation to FIGS. 1 and 2. The sensors 106, 108 are configured for detecting a first rotational position of one end of the member 102 and a second rotational position of the other end of the member, respectively. A differential between the first and second rotational positions is calculated, and the differential is used to determine a torque associated with the member 102 between the ends 104, 106. In certain implementations, the differential may be correlated with the known stiffness of the member 102.

In other implementations, torque may be calculated based on the differential between the first and second rotational positions and one or more alternative characteristics of the member 102.

FIG. 12 illustrates a second exemplary system for calculating one or more torque values. A connection point, such as a joint (e.g., a universal joint), may be used to connect two torsional members. In FIG. 12, torsional members 204 and 206 are coupled together via joint 202. Torque sensors 208 and 214 may be disposed adjacent the ends of torsional members 204 and 206, respectively, that are not coupled to the joint 202. The torque sensors 208, 214 are used to calculate the amount of torque applied to torque members 204 and 206, accounting for the torque characteristics of each torque member and joint 202.

Torque sensors 208 and 214 may be force-based torque sensors and may have a variety of shapes and sizes for engaging with the torsional members 204, 206. For example, torque sensors 208 and 214 may have a smaller profile than Hall effect sensors and/or provide direct feedback. The torsional members 204, 206 may have a defined pattern, such as a sinusoidal shape, defined on the outer surface thereof (or coupled to the outer surface thereof) that may engage with the torque sensors 208, 214. By being in contact with a varying topography on the torsional members 204, 206, torque sensors 208, 214, respectively, may provide signals to the processor(s) that is configured for determining the amount of force and torque applied to the torsional members 204, 206 and joint 202.

In this manner, the processor may calculate the amount of torque to provide a torque value that spans one or more connected torsional members. For example, torsional members 204, 206, and universal joint 202 may have known torque profiles. By comparing the torque sensed at torque sensors 208 and 214, and accounting for the torque profiles of torsional members 204, 206 and universal joint 202, the overall amount of torque in the system of FIG. 12 may be calculated.

Although not illustrated, additional torque sensors may be provided at the end 210 of torque member 204 and at the end 212 of torque member 206. Ends 210 and 212 are coupled to the joint 202. These additional torque sensors allow the system to calculate torque for each individual torque member 204, 206, as described above with respect to FIG. 11. Furthermore, these additional torque sensors allow the system to calculate torque for one of the torque members 204, 206 and the joint 202 disposed between the sensors.

While a universal joint has been described in this exemplary embodiment, other joints may also be used to connect two or more torsional members. Further, the angle at which torsional members 204, 206 are coupled to the joint 202 may vary so that signals from force-based torque sensors may be used in a variety of applications to determine the amount of torque throughout a system. For example, force-based torque sensors may be placed throughout a vehicle's steering system to determine not only the amount of torque applied by a user to a steering wheel, but also torque applied by roads and driving conditions.

FIG. 13 illustrates an exemplary method for calculating one or more torque values. At step 302, a first rotational position of a first axial location of an elongate vehicle member may be detected. The first axial location may be end 104 of torsional member 102 in FIG. 11, for example, or another location along a rotational axis of the member 102 between ends 104. The rotational position may be detected using, for example, signals from force-based torque sensor 106. Next, at step 304, a second rotational position of a second axial location of the elongate vehicle member may be detected. For example, the second axial location may be the other end 104 of the member 102, or another location along the axis of member 102 between ends 104. The rotational position of the other end 104 may be detected using signals from torque sensor 108, for example. The first axial location is spaced apart from the second axial location along the rotational axis of the elongated vehicle member. Next, a differential between the first and second rotational positions is calculated at step 306. The differential may be correlated with the known stiffness of the elongate vehicle member, also referred to as a torsional member, as well as any intervening joints. The elongate vehicle member may include one or more discrete components, such as torque member 204, joint 202, and/or torque member 206, as illustrated in FIG. 12.

Using this differential, a torque associated with the elongate vehicle member between the first and second axial locations may be determined at step 308. This may include using the pre-determined stiffness profile. The calculated torque may be used to control a system of the vehicle. For example, the system may be used to determine that a user has provided a sudden movement to the steering wheel. A sudden movement may indicate an attempt to avoid an accident. In this situation, the determined torque value may be used by the vehicle's safety system to pretension seatbelts. The determined torque may also be used to prompt activation of the vehicle's stability control system.

As another example, the amount of sensed torque may be used to engage and/or control the amount of power assist by a power steering system. The vehicle may increase power steering assist when it detects an increased amount of torque. For example, a user navigating a parking lot at low speeds may have to turn the steering wheel relatively hard to get the wheels to turn. By calculating the torque applied to a steering wheel to turn the vehicle, the power steering assist may increase to assist the user with turning the vehicle. At higher speeds, the amount of power steering assist may be reduced in association with the system sensing decreased torque. This prevents relatively small inputs to the steering wheel from causing a vehicle to steer off course quickly at high speeds. As another example, the amount of power steering assist may also relate to a vehicle operation mode, such as a comfort or touring mode and a sport or race mode. In a comfort mode, the power steering assist may be controlled using the determined torque values so that lighter steering inputs are needed to cause the vehicle to turn. In a race mode, the steering wheel system may become heavier in the sense that more force will be required to cause the vehicle to turn. The amount of power steering assist may therefore engage dynamically in proportion to the detected amount of torque. In addition, the amount of power steering assist may depend on one or more operating conditions of the vehicle.

Referring back to FIG. 9, a torque module 590 may be provided to calculate the amount of torque applied to a beam, such as a steering column, based on measurements from rotational sensors. These torque values may be provided to other vehicle subsystems. For example, the vehicle traction control system, automated cruise control, safety systems (such as seat belt pre-tensioning, airbag system, and rollover protection systems), and other systems may receive the results of calculating the amount of torque to a steering column. In this manner, the vehicle may determine, for example, that the steering wheel has been turned abruptly by a user which may indicate an attempt to avoid an accident.

The invention claimed is:

1. A position sensor system that senses a relative position between a reference physical object and a sensed physical object wherein the sensed physical object has a varying surface, the position sensor system comprising:
   at least one force sensor supported by the reference physical object and positioned adjacent to and in communication with the varying surface;
   a spring medium, wherein the spring medium bridges a space between the force sensor and the varying surface and the at least one force sensor is in communication with the varying surface through the spring medium, and wherein movement of the sensed physical object having the varying surface causes a varying application of force to the at least one force sensor through the spring medium,
   wherein the at least one force sensor generates a force signal related to the varying application of force applied to the at least one force sensor by the varying surface; and
   a computer processor in electrical communication with the at least one force sensor, wherein the processor receives the force signal, determines, using the force signal, the position of the sensed physical object relative to the force sensor, and controls a system of a vehicle using the determined position.

2. The position sensor system of claim 1, wherein the varying surface varies continuously through a range of positions.

3. The position sensor system of claim 2, wherein the range of positions is 0 to 360 degrees.

4. The position sensor system of claim 1, wherein the sensed physical object has a circular cross-section and wherein the varying surface extends along an outer circumference of the circular cross-section.

5. The position sensor system of claim 4, wherein the position of the sensed physical object is a rotational position.

6. The position sensor system of claim 1, wherein the varying surface has a repeating shape.

7. The position sensor system of claim 6, wherein the repeating shape has a series of maxima and minima and wherein the position sensor system includes a counter configured to track the passage of maxima and minima.

8. The position sensor system of claim 7, wherein the processor determines the position using the passage of maxima and minima.

9. The position sensor system of claim 1, wherein the varying surface has a plurality of discontinuities.

10. The position sensor system of claim 9, wherein the discontinuities are transitions between a plurality of flat surfaces.

11. The position sensor system of claim 10, wherein the discontinuities are sides of a plurality of steps and the flat surfaces are tops of a plurality of steps.

12. The position sensor system of claim 11, wherein the steps extend in a sinusoidal pattern.

13. The position sensor system of claim 1, wherein the spring medium is one of an elastomer or a mechanical spring.

14. The position sensor system of claim 1, wherein the varying surface is positioned between a pair of bearings.

15. The position sensor system of claim 14, wherein the varying surface is on a flange extending from the sensed physical object.

16. The position sensor system of claim 15, wherein the sensed physical object is a shaft.

17. The position sensor system of claim 16, wherein the at least one force sensor includes a plurality of force sensors.

18. The position sensor system of claim 17, wherein the plurality of force sensors are equally spaced around and adjacent to the varying surface.

19. The position sensor system of claim 18, wherein the plurality of force sensors includes 4 sensors arranged at 90 degree intervals around the varying surface.

20. The position sensor system of claim 1, wherein the reference physical object and sensed physical object are relatively moveable with a rotational component.

21. The position sensor system of claim 1, wherein the reference physical object and sensed physical object are relatively moveable with a translational component.

22. The position sensor system of claim 1, wherein the varying surface includes at least one key feature differing from the remainder of the varying surface.

23. The position sensor system of claim 22, wherein the at least one key feature is one of a high or low points relative to the remainder of the varying surface.

24. The position sensor system of claim 22, wherein the at least one key feature is a plateau.

25. The position sensor system of claim 22, wherein the processor is configured to associate the at least one key feature with a zero point.

* * * * *